(12) United States Patent
Vedula

(10) Patent No.: US 7,571,158 B2
(45) Date of Patent: Aug. 4, 2009

(54) UPDATING CONTENT INDEX FOR CONTENT SEARCHES ON NETWORKS

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 114 days.

(21) Appl. No.: 11/309,831

(22) Filed: Oct. 9, 2006

(65) Prior Publication Data

US 2008/0065597 A1 Mar. 13, 2008

(30) Foreign Application Priority Data

Aug. 25, 2006 (IN) .......................... 1533/CHE/2006

(51) Int. Cl.
G06F 17/30 (2006.01)
(52) U.S. Cl. .......................................... 707/3; 707/100

(58) Field of Classification Search ....................... None
See application file for complete search history.

(56) References Cited

U.S. PATENT DOCUMENTS

| | | | |
|---|---|---|---|
| 2002/0059399 A1* | 5/2002 | Learmonth | 709/219 |
| 2005/0004799 A1* | 1/2005 | Lyudovyk | 704/254 |
| 2006/0161990 A1* | 7/2006 | Frey et al. | 726/26 |
| 2006/0248128 A1* | 11/2006 | Acharya et al. | 707/203 |

* cited by examiner

*Primary Examiner*—Don Wong
*Assistant Examiner*—Belinda Xue

(57) ABSTRACT

According to an aspect of the present invention, update requests indicating the changes in content are created external to an application causing the changes, and a content index is updated based on the update requests. In an embodiment, the changes are detected based on examining packet contents on the way to a data repository (e.g., database server). As a result, the overhead in data repositories as well as any crawlers updating the content index may be reduced.

17 Claims, 5 Drawing Sheets

| Source Address 420 | Destination address 425 | Type 430 | Unique ID 440 | Source port 450 | Destination port 455 | Payload 470 |
|---|---|---|---|---|---|---|

*FIG. 4*

UPDATING CONTENT INDEX FOR CONTENT SEARCHES ON NETWORKS

RELATED APPLICATIONS

The present application is related to and claims priority from the co-pending India Patent Application entitled, "UPDATING CONTENT INDEX FOR CONTENT SEARCHES ON NETWORKS", Serial Number: 1533/CHE/2006, Filed: Aug. 25, 2006, naming the same inventors as in the subject patent application.

BACKGROUND OF THE INVENTION

1. Field of the Invention

The present invention relates to management of electronic records used by systems such as search engines, and more specifically to a method and apparatus for updating content index for content searches on a network.

2. Related Art

There is a recognised need in the market place to search the content provided on various networks and provide the results of searches. For example, a user may access a search engine by a suitable interface (e.g., provided by a web browser) and provide a search criteria (or a query, in general). The search engine performs a search for content matching the search criteria, and sends the results to the user.

The content accessible on the networks is often indexed and stored to enable a faster/efficient search. In general, the indexes are examined to determine the matching content and/or various attributes such as metadata representing the security features (read write permissions), status (last modified/accessed date), access control (who can access the data), etc.

One general requirement is that the indexes be updated to reflect the changes in the content (to be searched). If the indexes are not accurately updated, the search results may correspondingly be erroneous.

In one prior embodiment, a crawler parses databases storing the contents at regular intervals, and updates the indexes to reflect the changes. However, a shorter crawling interval leads to use of undesirable processor time/power. Alternately, a longer interval fails to update the changes for a corresponding long time, thereby providing stale, old or invalid results to a search request (query).

Accordingly, what is needed is a efficient updating of content index for accurate search results without loading the processor time and power.

BRIEF DESCRIPTION OF THE DRAWINGS

The present invention will be described with reference to the accompanying drawings briefly described below.

FIG. 4 is a diagram illustrating the manner in which a packet format can be used to determine the changes to desired content in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, updates as to changes in content are detected external to applications causing the changes, and a content index is updated with the changes. Due to such detection external to the applications, the overhead on applications may be reduced, in addition to reduction in development of the application logic (software and/or hardware).

In an embodiment, the detection is based on examining packet contents on the way to a data repository (e.g., database server) which stores the content of interest. As a result, the overhead in data repositories as well as any crawlers updating the content index may be reduced.

In one implementation, the packets are examined in a web/application server which is in the path from a client system to the data repository. In another implementation, a monitoring device which passively monitors packets destined to the data repository, is provided. The changes may be propagated by sending the appropriate packets to a crawler or by storing the change information in a secondary storage, with the crawler propagating the changes later to the content index/database.

According to another aspect of the present invention, database triggers are provided to propagate the change information to the content index when changes are made in the contents of the database.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the features of the invention.

2. Example Environment

Figure 1:
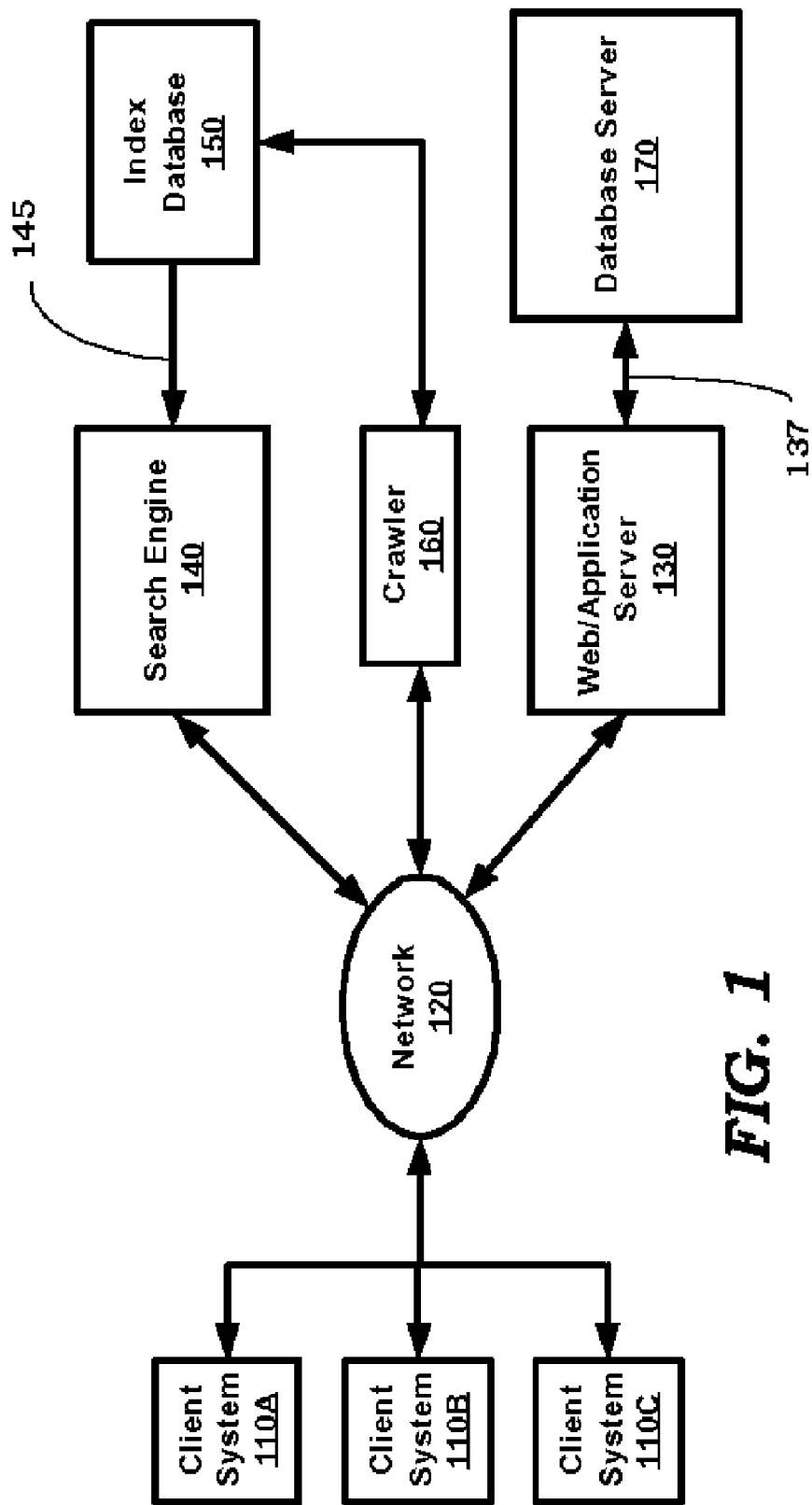
FIG. 1 is a block diagram of an example environment in which various aspects of the present invention can be implemented.

FIG. 1 is a block diagram illustrating an example environment in which various aspects of the present invention can be implemented. The environment is shown containing client systems 11A-11C, network 120, web/application server 130, search engine 140, index database 150, crawler 160, and database server 170. Each system is described in further detail below.

Client systems 110A-110C enable users to access various applications executing on application server 130, and also to send search requests to search engine 140. In general, packets are sent and received on network 120 when a client system accesses the applications or sends search requests. The commands contained in the packets may cause application server 130 to change the content stored in database server 170. Similarly, client systems 110A-110C may send search requests to search engine 140 and receive the results in corresponding packets also.

Database server 170 (example of a data repository) stores content, which can be searched via search engine 140, as described in sections below. The content can represent any information (or stored entities) such as web pages, email messages, file structure/content, tables, etc. Application server 130 executes a number of applications and causes changes (in addition to read operations) in the content (data or metadata) stored in database server 170, typically in response to commands received in packets from client systems 110A-110C.

In an embodiment, database server 170 is implemented using Oracle 9i software available from Oracle International Inc., the intended assignee of the subject patent application, and application server 130 is implemented using Oracle Application Server 10g, available from Oracle Corporation, the intended assignee of the subject patent application. Though a single database server and a single application server are shown in FIG. 1, it should be appreciated that typical environments would contain many of such systems, and substantially more content stored in such database servers may be managed according to various aspects of the present invention.

Index database 150 stores a content indexes (indices), which facilitates search (and possibly easy access) of content stored in various sources, including database server 170. The index information may indicate the key words for which the corresponding document needs to be considered as a match and various attribute information corresponding to the document, noted above. The index information is generally organized consistent with the search strategy of search engine 140.

Search engine 140 receives search requests from client systems 110A-110C and examines the content index (by retrieving the corresponding data on path 145) to process the search requests. It may be appreciated that the accuracy of the search results depends on the accuracy of the content index in representing the state of various contents of interest.

Crawler 160 is designed to update content index in index database 150. Crawler 160 receives data representing the changes to contents of interest, and updates the content index accordingly. In an embodiment, the data is received by crawling (retrieves and examines) the content in various databases at regular intervals. Such an approach may have various disadvantages, as noted above.

Alternatively, crawler 160 may asynchronously (without crawling) receive update requests from various sources according to various aspects of the present invention, and update the content index accordingly. The update requests can be formed using various protocols (e.g., built on top of socket interfaces provided in TCP/IP environments), as will be apparent to one skilled in the relevant arts by reading the disclosure provided herein.

Crawler 160, in turn, can be implemented using various approaches well known in the relevant arts. For example, the updates can be received via JMS (Java messaging Service), Oracle Advanced Queues (AQ) or simple Database tables. Crawler 160 may then be configured to subscribe to a JMS Queue or AQ, which will be indicated via Callbacks (or interrupts) when there is a message ready for consumption. The Callbacks may alternatively be invoked once per N messages (N>1) to allow bulk processing.

Various aspects of the present invention enable the content index to be maintained accurately, without consuming substantial processing power, as described below in further detail.

3. Updating Content Index

Figure 2:
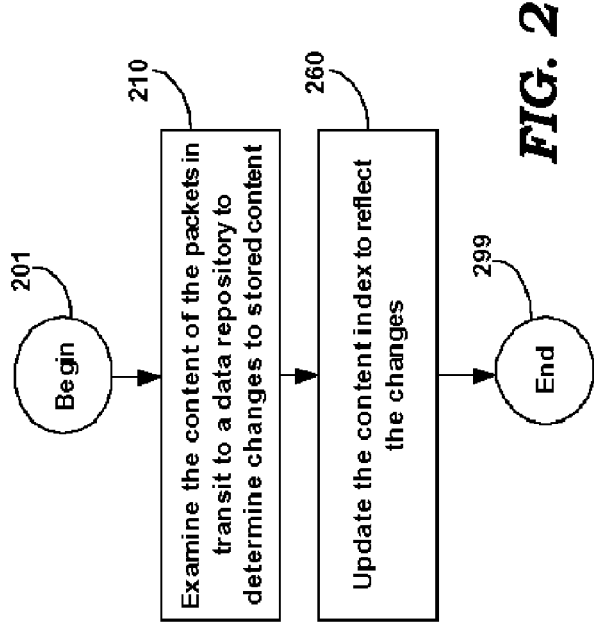
FIG. 2 is a flowchart illustrating the manner in which content index is updated according to an aspect of the present invention.

FIG. 2 is a flowchart illustrating the manner in which content index is maintained to accurately reflect the changes to content according to an aspect of the present invention. The flowchart is described with respect to FIG. 1 for illustration. However, the features can be implemented in various other environments as will be apparent to one skilled in the relevant arts by reading the disclosure provided herein. The flowchart begins in step 201, in which control immediately passes to step 210.

In step 210, the data contents in transit to data repository are examined to determine any changes to stored content (either data itself or meta-data representing the properties of the stored data/file). Thus, with respect to FIG. 1, when data content being transferred to database server 170 in the form of packets, the content of the packets may be examined to determine any changes to the content stored in database server 170.

In step 260, content index in index database 150 is updated to reflect the determined changes. In general, the update operation can be performed in any way consistent with the implementation of the server controlling/managing the content index. With respect to FIG. 1, a message of suitable format may be sent to crawler 160 to cause crawler 160 to update the content index. The flowchart ends in step 299.

By determining the changes based on content of packets in transit, it should be appreciated the load on crawler and database servers is reduced. At the same time, the updates are performed timely, as desired. It should be appreciated that the features of FIG. 2 can be implemented in various locations/systems. The description is continued with respect to various example embodiments.

4. Application Server

Figure 3A:
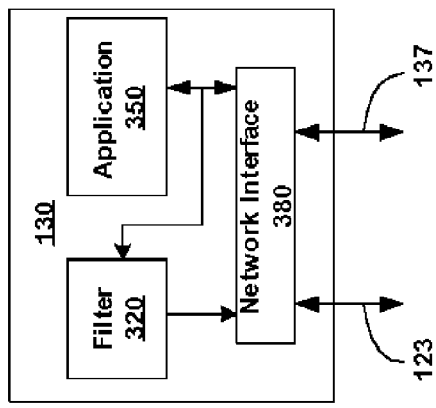
FIGS. 3A is a block diagram illustrating the details of an application server in one embodiment.

FIG. 3A is a block diagram illustrating the manner in which changes are determined by monitoring the packets received by application server 130 according to an aspect of present invention. The block diagram is shown containing filter 320, application 350 and network interface 380. Each block is described below in further detail.

Network interface 380 provides the physical, electrical and protocol interface for application server 130 to interface with network 120. In addition, network interface 380 receives data from application 350 and filter 320 and transmits the received data on network 120 in a suitable packet format. Network interface 380 receives packets on network 120 (for example, from client systems 110A-110C) and forwards the received packet to application 350 in a suitable format.

Application 350 receives packets through network interface 380 and effects a read or write operation to database server 170 in response to appropriate commands encoded in the packet content. Alternatively, application 350 may merely pass-through the commands (in the form of SQL statements) directed to database server 170. Application 350 further processes the data received from database server 170 (as a response to the commands), and passes the response to the corresponding client system as appropriate.

Filter 320 (implemented external to application 350, for example, as a lower priority process which does not at least substantially impede the performance of application 350) examines the data contents in transit to database server 170 and determines any changes to the content in database server 170. For example, filter 320 may 'snoop' the data sent to/from application 350 to determine the changes being effected to the content of database server 170.

Filter 320 may then cause the change information to be propagated to the content index by creating and sending update requests (by interfacing with network interface 380).

For example, filter 320 may send appropriate triggers to cause crawler 160 to update the content index. The triggers may be implemented according to any suitable compatible protocols (between filter 320 and crawler 160).

Figure 3B:
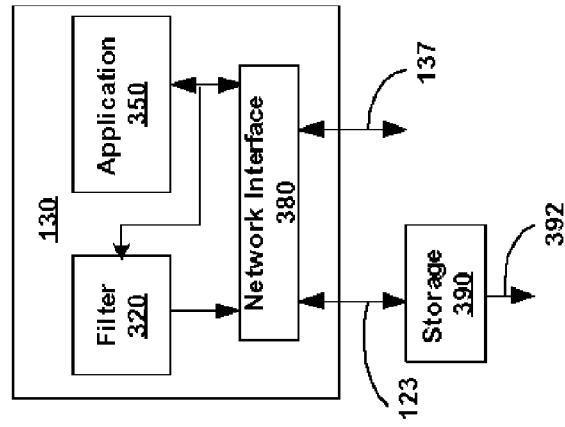
FIGS. 3B is a block diagram illustrating the details of an application server in an alternative embodiment.

Alternatively, the change requests may be stored in a storage and crawler 160 may crawl the changes later, as described with respect to FIG. 3B. For conciseness the blocks operating similar to those in FIG. 3A are shown with same reference numerals/labels and only the differences from that in FIG. 3A are described. Shown there in FIG. 3B is storage 390 in addition to the components described in FIG. 3A.

Filter 320 identifies the changes to content of database server 170 by monitoring the packets from/to application 350. Filter 320 stores the information (representing the content being modified, location etc.,) in storage 390. Crawler 160 then crawls storage 390 periodically, and updates the content index.

In one embodiment, filter 320 merely stores data indicating the addresses (or records or rows of tables in case of relational databases) at which changes have occurred, and crawler 160 may further crawl only the contents at the locations indicated in the storage 390 to obtain modified data. Alternatively, filter 320 may store all information needed by crawler 160 in storage 390 such that crawler 160 merely needs to crawl storage 390 to update content index (index databases 50).

For example, the stored information may contain the following information, with each line indicating a change to the corresponding content:

http://myhost/orders/order_acme.xls, 252525, SEC_CHANGED http://myhost/orders/order_foo.doc, 252562, CONTENT_CHANGED In the above records, the first field represents the URL, using which the content can be fetched, the second field represents the identifier of the document (which can be used to retrieve just meta-data, as opposed to content), and the third field represents the type of change.

The description is continued with respect to the manner in which packets may be examined/snooped to identify the change of contents of database server 170.

5. Identifying Changes to Content

It should be appreciated that the determination of changes generally depends on the specific packet formats and the protocols employed by the applications. The manner in which changes to content may be identified is illustrated with respect to some example scenarios below.

In one embodiment, it is assumed that a Web application provides access to the content over the internet using HTTP and the related packets may be examined to determine that the contents of database server 170 are going to be changed. For example, (with reference to FIG. 4) an IP packet in such a scenario would have a source address 420 equaling the IP address of the client system 110A from which the change request has originated, destination address 425 equals the IP address of application server 130, destination port 455 equals a value of 0x80 to represent HTTP request, and payload 470 may indicate the change sought. For example, HTTP PUT request (defined in detail in RFC 2616) may be encoded in payload 470 to specify a change.

In one implementation, filter 320 is implemented as a Servlet filter, which examines the request parameters and the URL and decides whether a change in the content is being requested. Such a decision may be based upon a simple URL pattern (however the approach can be extended to use a complex matching algorithm). For example, the below parameters indicate that an order form (a document) is being updated:

POST http://www.myserver.com/ordersys/updateOrderForm.jsp
  host: myserver.com
  content_type: 14
  id=232452&qty=25&price=90&loc=US.

It should be appreciated that changes to content can be identified in various other ways depending on the specific environment. For example, when a client system (e.g., 110A) interacts with a FTP server (not shown, but connected to network 120 as a server), a change is generally initiated by a well known VERB (Command) such as PUT, DELETE. The packet payload can be examined (e.g., in Netmon 510 described below) to determine the presence of these commands. Alternatively, a FTP proxy (similar to filter 320) may trigger a content change event and pushes it to the crawler.

While the above implementations are described as being performed within application/FTP servers, it should be appreciated that alternative embodiments can be implemented in other blocks, without departing from the scope and spirit of various aspects of the present invention, as described below in further detail below.

6. Network Monitor

Figure 5:
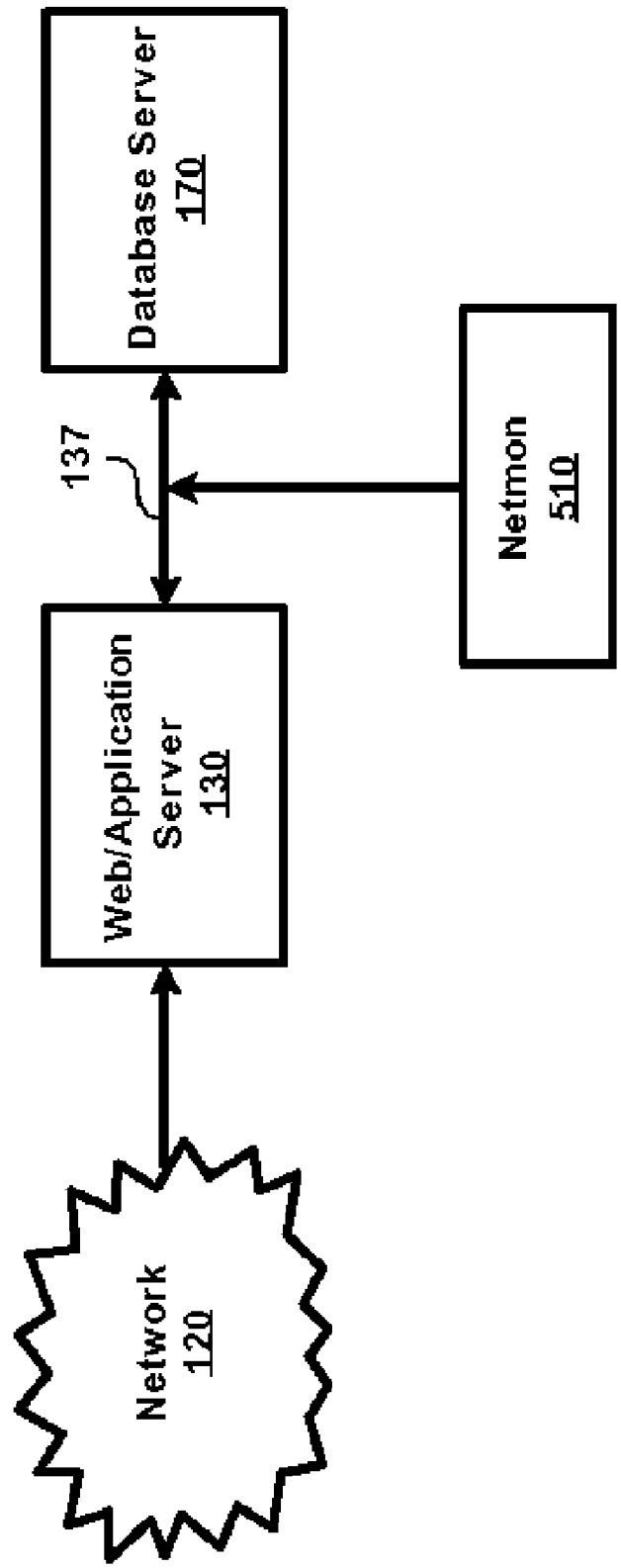
FIG. 5 is a block diagram illustrating the manner in which the packets on a network can be monitored to determine the changes to desired contents in an embodiment.

According to an aspect of the present invention, a network monitor unit may be implemented to monitor the packets destined to database server 170, as illustrated with respect to FIG. 5. As shown there, Netmon 510 may be implemented to monitor the packets on path 137 (e.g., implemented as an Intra-net LAN).

Netmon 510 may contain a network interface similar to network interface 380, but forwarding all packets to a filter (implemented using the same principles as filter 320 in examining packet content and determining the occurrence of changes). The filter may then operate as described above respect to FIG. 3A or 3B. In general, netmon 510 and web/application server 130 operate as monitoring systems which detect changes to desired content (in this case in database server 170), and cause the corresponding information to be propagated to the content index.

While the above implementations are described as being external to database server 170, more alternative embodiments may be implemented within database server 170 without departing from the scope and spirit of various aspects of the present invention as described below in further detail.

7. Database Triggers

According to an aspect of the present invention, database triggers are programmed within database server 170 to send change related information to crawler 160. As is well known in the relevant arts (and described, for example, in Chapter 10 of a book entitled, "Oracle Database 10 g PL/SQL Programming, By: Scott Urman et al, ISBN: 0072230665), database triggers are programs that implicitly start when an INSERT, UPDATE, or DELETE statement for a base table is executed. A trigger can contain several SQL statements. A series of control structures are also generally available for the application programmer. One can program loops or branches, for example, within a trigger.

Thus, when a database centric application (e.g., application 350) triggers a content update, a database trigger may be invoked post (after) update of a specific column in the Database. This column can correspond either to the content or to the metadata associated with the content. The trigger may be designed to push the content change event to crawler 160, as described above. The implementation of the triggers consistent with the interface requirements of crawler 160 will be apparent to one skilled in the relevant arts by reading the disclosure provided herein.

The features described above can be implemented using a combination of hardware, software and firmware as suitable for specific situations. The description is continued with respect to an example embodiment in which various features are operative by execution of appropriate software instructions.

8. Digital Processing System

Figure 6:
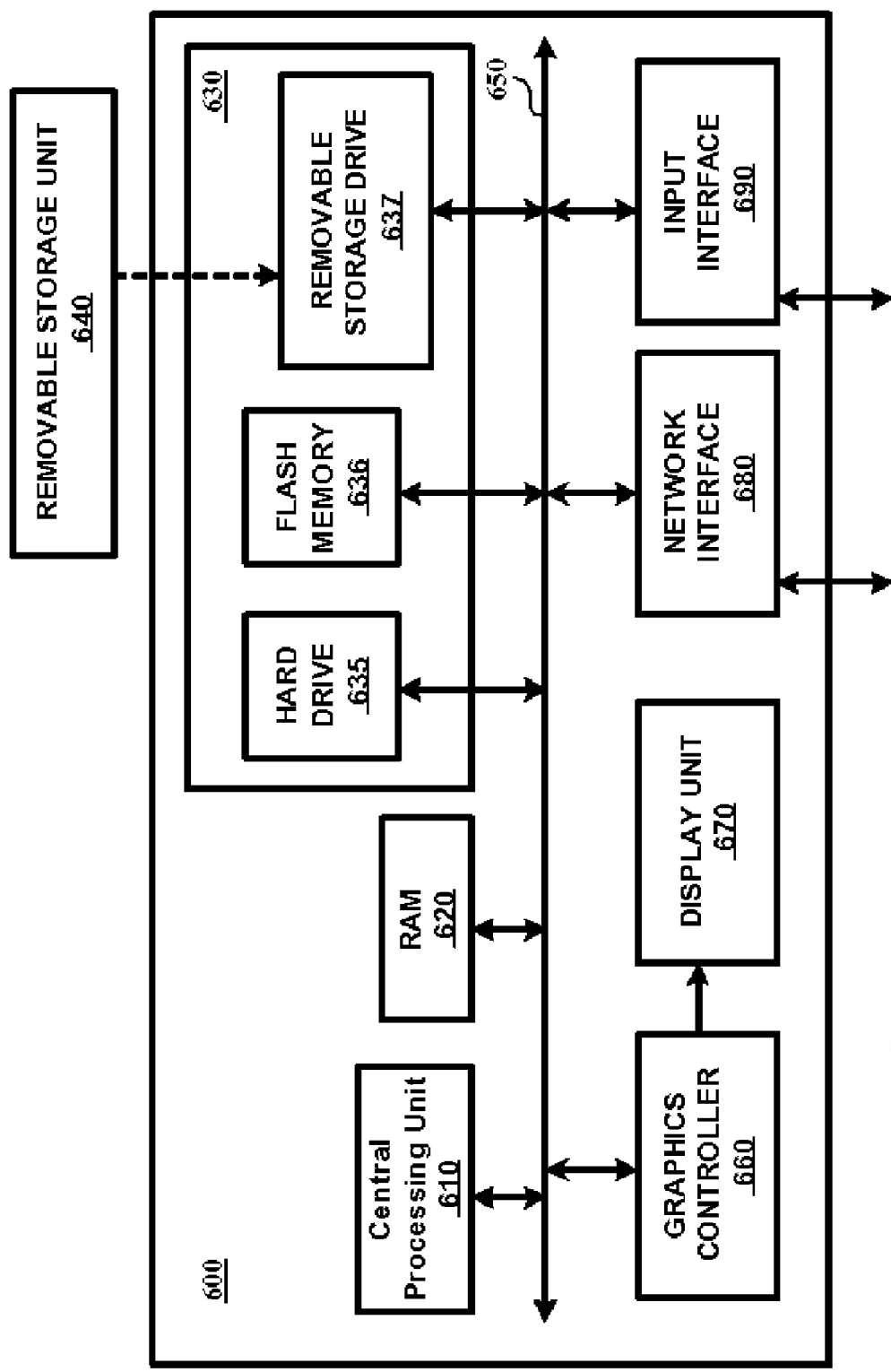
FIG. 6 is a block diagram illustrating an example embodiment in which various aspects of the present invention are operative when software instructions are executed.

FIG. 6 is a block diagram illustrating the details of digital processing system 600 in which various aspects of the present invention are operative by execution of appropriate software instructions. System 600 may correspond to each of application server 130, netmon 510, FTP server, etc., described above. System 600 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. For example, tasks such as monitoring of packets for changes, sending appropriate commands to web crawlers, etc., may be performed in response to execution of the instructions. CPU 610 may contain multiple processing units, with each processing unit potentially being designed for a specific task. Alternatively, CPU 610 may contain only a single general purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a key_board and/or mouse (not shown in FIG. 6). Network interface 680 provides connectivity to a network (e.g., using Internet Protocol), and may be used to communicate with the other systems of FIG. 1.

Secondary memory 630 may contain hard drive 635, flash memory 636 and removable storage drive 637. Secondary memory 630 may store the data and software instructions (e.g., methods instantiated by each of client system), which enable system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD_ROM drive, DVD Drive, Flash memory, removable memory chip (PCMCIA Card, EPROM) are examples of such removable storage drive 637.

Removable storage unit 640 may be implemented using medium and storage format
compatible with removable storage drive 637 such that removable storage drive 637 can read
the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to system 600. CPU 610 may retrieve the software instructions, and execute the instructions to provide various features of the present invention described above.

From the above, it may be appreciated that various embodiments provide the ability to detect change asynchronously without the application (which would cause changes to the data to be searched) having to detect and/or propagate such changes. As a result, the overhead on the applications is reduced. In addition, the overhead on crawler type devices is also reduced since the notification of updates are received asynchronously.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A system comprising:
a processor;
a memory;
a data repository containing a plurality of stored entities;
an index database storing indices containing key words facilitating identification of suitable ones of said plurality of stored entities matching a desired search criteria;
a search engine receiving a query with said desired search criteria and determining a search result by examining said index database;
a server to execute an application designed to receive a first plurality of packets from a plurality of clients on a network, said first plurality of packets specifying a corresponding set of changes sought to be effected to said plurality of stored entities contained in said data repository, said application to thereafter forward said set of changes as a second plurality of packets on a path to said data repository to cause the same set of changes as specified in said first plurality of packets to be effected in said data repository;
a crawler which is designed to update said index database; and
a filter block implemented external to said application by said processor based on execution of instructions retrieved from said memory, said filter block to passively monitor said second plurality of packets on said path to detect said set of changes and to generate a packet representing said set of changes, wherein said packet is designed to propagate information on said same set of changes as specified in said first plurality of packets to said index database,
wherein said filter block sends said packet to cause said crawler to propagate information on said same set of changes to said index database,
wherein said crawler is provided separately from said filter block.

2. The system of claim 1, wherein said server comprises an application server executing said application and said data repository comprises a database server, wherein said filter block is also implemented internal to said application server, and wherein said path is from said application to said database server.

3. The system of claim 2, wherein said filter block sends said packet with a destination address of said crawler to cause said crawler to propagate said set of changes to said index database.

4. The system of claim 2, wherein said filter block stores said packet indicating said set of changes in a storage and said crawler crawls said storage periodically to propagate said set of changes to said index database.

5. The system of claim 1, wherein said filter block is implemented in a monitoring system provided external to said server, wherein said monitoring system is connected to a communication path carrying said second plurality of packets in transit to said data repository, said communication path forming a part of said path external to said server, whereby said monitoring system passively monitors said communication path to detect said same set of changes as specified in said first plurality of packets.

6. The system of claim 1, wherein said data repository comprises a file transfer protocol (FTP) server, and said filter block examines verb commands directed to said FTP server to detect said set of changes sought to be effected to said plurality of stored entities.

7. The system of claim 1, wherein one of said set of changes represents at least one of deletion of one of said plurality of stored entities, addition of a new entity to said plurality of stored entities, or a change of an attribute of one of said plurality of stored entities.

8. A method of maintaining index information used for searching content on networks, said method comprising:
   providing an index database to store an index information containing key words facilitating identification of portions of a data content matching desired search criteria, said data content being stored in a data repository;
   receiving in an application a first plurality of packets from a plurality of clients on a network, said first plurality of packets specifying a set of changes sought to be effected to said data content;
   forwarding from said application said set of changes as a second plurality of packets on a path to said data repository, wherein said forwarding is performed in response to said receiving, wherein said second plurality of packets causes the same set of changes as specified in said first plurality of packets to be effected to said data content stored in said data repository;
   monitoring passively said second plurality of packets forwarded on said path to detect said set of changes sought to be effected to said data content, wherein said monitoring is performed external to said application;
   creating a packet containing a set of update requests upon said detecting; and
   sending by a processor said packet containing said set of update requests to cause a crawler to update said index information in said index database with information indicating said same set of changes specified in said first plurality of packets and effected to said data content,
   wherein said crawler is provided separately from a filter block performing said Monitoring, said creating and said sending.

9. The method of claim 8, wherein said sending causes storing of data indicating said set of changes in a storage and wherein said crawler crawls said storage periodically to propagate information representing said set of changes to said index database.

10. The method of claim 8, wherein a server executes said application, said server being different from said monitoring system implementing said filter block, wherein said monitoring monitors a communication path from said server to said data depository to detect said same set of changes as specified in said first plurality of packets, wherein said communication path forms a part of said path external to said server.

11. The method of claim 8, wherein said data repository comprises a file transfer protocol (FTP) server, wherein said examining examines verb commands directed to said FTP server to detect said set of changes.

12. A computer readable storage medium storing one or more sequences of instructions to maintain index information used for searching content on networks, wherein execution of said one or more sequences of instructions by one or more processors to perform the actions of:
   monitoring passively a second plurality of packets forwarded on a path from an application to a data repository to detect a set of changes sought to be effected to a data content stored in said data repository,
   wherein said second plurality of packets are forwarded by said application upon receiving a first plurality of packets from a plurality of a clients on a network, both of said first plurality of packets and said second plurality of packets specifying the same said set of changes, wherein said monitoring is performed external to said application;
   creating a packet containing a set of update requests upon said detecting; and
   sending said packet containing said set of update requests to cause a crawler to update said index information in an index database with information indicating said same set of changes specified in said first plurality of packets and effected to said data content,
   wherein said index information contains key words facilitating identification of portions of said data content matching desired search criteria,
   wherein said monitoring, said creating and said sending are performed in a filter block, wherein said crawler is provided separately from said filter block.

13. The computer readable storage medium of claim 12, wherein said sending causes storing of said information in a storage and wherein said crawler crawls said storage periodically to propagate said set of changes to said index database.

14. The computer readable storage medium of claim 12, wherein said sending sends said packet with a destination address of said crawler to cause said crawler to propagate said set of changes to said index database.

15. The computer readable medium of claim 12, wherein said data repository comprises a database server, wherein said path is from said application to said database server.

16. The method of claim 8, wherein said sending sends said packet with a destination address of said crawler to cause said crawler to propagate said set of changes to said index database.

17. The method of claim 8, wherein said data repository comprises a database server, wherein said path is from said application to said database server.

* * * * *

UNITED STATES PATENT AND TRADEMARK OFFICE
CERTIFICATE OF CORRECTION

| | | |
|---|---|---|
| PATENT NO. | : 7,571,158 B2 | Page 1 of 1 |
| APPLICATION NO. | : 11/309831 | |
| DATED | : August 4, 2009 | |
| INVENTOR(S) | : Venkata Naga Ravikiran Vedula | |

It is certified that error appears in the above-identified patent and that said Letters Patent is hereby corrected as shown below:

In column 1, line 61, delete "FIGS. 3A" and insert -- FIG. 3A --, therefor.

In column 1, line 63, delete "FIGS. 3B" and insert -- FIG. 3B --, therefor.

In column 2, line 54, delete "11A-11C," and insert -- 110A-110C, --, therefor.

In column 5, line 25, delete "databases 50)." and insert -- database 150). --, therefor.

In column 9, line 54, in claim 8, delete "Monitoring," and insert -- monitoring, --, therefor.

Signed and Sealed this

Twenty-ninth Day of June, 2010

David J. Kappos
*Director of the United States Patent and Trademark Office*